Dec. 21, 1937.  E. A. TURNER  2,103,045
LOCOMOTIVE STOKER
Filed Dec. 20, 1935
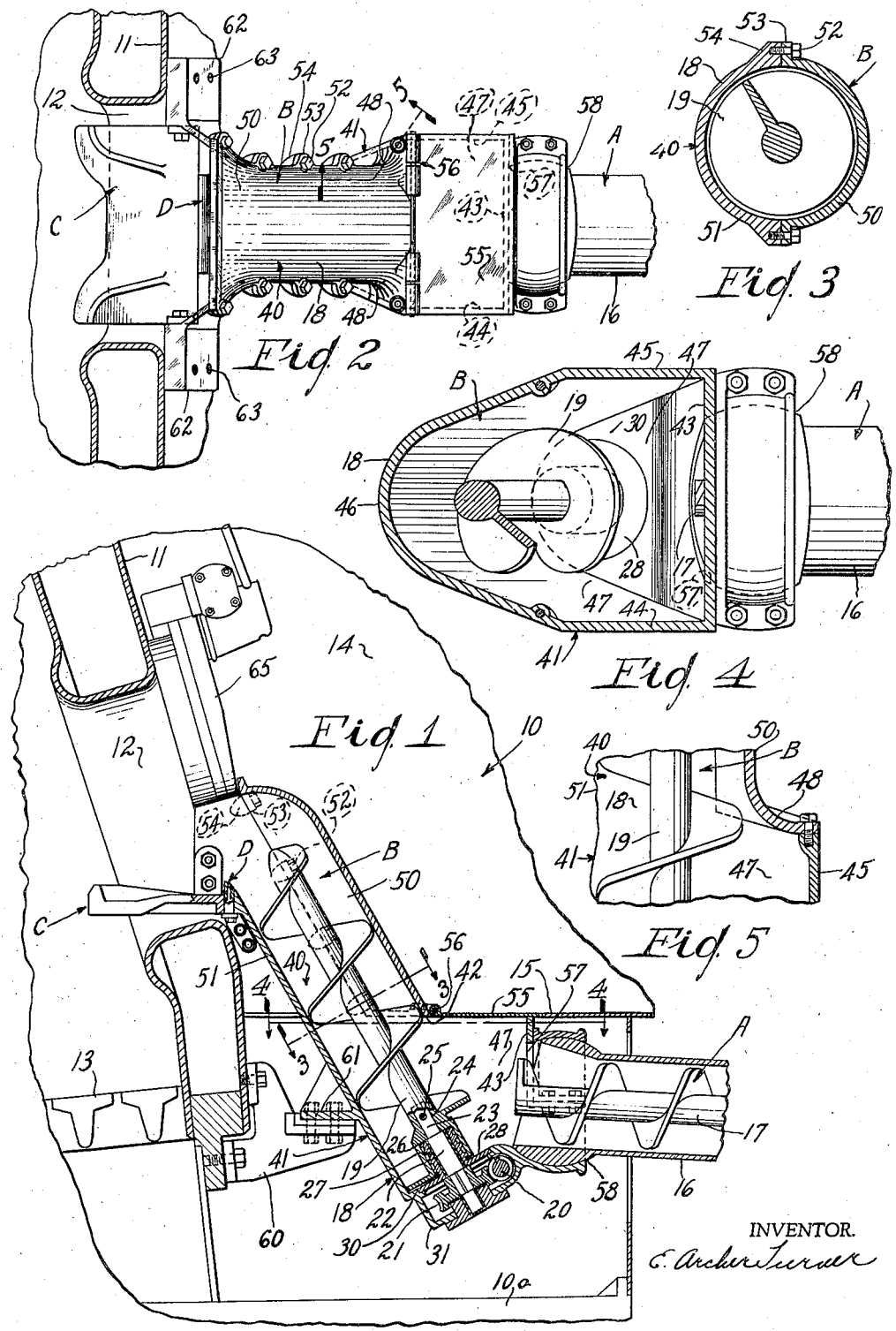
INVENTOR.
E. Archer Turner Patented Dec. 21, 1937

2,103,045

UNITED STATES PATENT OFFICE 2,103,045

LOCOMOTIVE STOKER

Edwin Archer Turner, New York, N. Y., assignor, by mesne assignments, to The Standard Stoker Company, (1922), New York, N. Y., a corporation of Delaware Application December 20, 1935, Serial No. 55,303

4 Claims. (Cl. 198—15)

My invention relates to the type of locomotive stoker wherein screw conveyors transfer the fuel from the fuel bin of the tender and elevate it to the firing opening of the locomotive.

The main object of the invention is to simplify and improve the elevating conveyor of the aforesaid type of stoker. More specifically, the purpose of the invention is to provide an elevating conveyor so constructed that the elevator screw may be readily removed from the elevator conduit while in place on the locomotive.

Other objects reside in the particular form and construction of the elevator conduit hereinafter described and as illustrated in the accompanying drawing, in which, Fig. 1 is a vertical, central, longitudinal sectional view of the stoker together with adjacent parts of the locomotive;

Fig. 2 is a plan view of the stoker of Fig. 1 showing the backhead in section and the cab deck removed;

Fig. 3 is a transverse cross section of the elevating conveyor taken on the lines 3—3 of Fig. 1;

Fig. 4 is a plan sectional view of the elevating conveyor taken on the line 4—4 of Fig. 1; and Fig. 5 is a sectional view taken on the broken line 5—5 of Fig. 2.

On the drawing, the reference character 10 designates a locomotive of any approved construction having a backhead 11 provided with the firing opening 12. The grates are indicated at 13, the cab at 14 and the cab deck at 15.

The stoker comprises a transfer conveyor A which brings the fuel from the tender (not shown) to the locomotive 10 and an upwardly extending elevating conveyor B, which delivers the fuel onto a distributing plate C in the firing opening 12 from which it is blown over the grates 13 by a steam blast discharging from the distributor head D.

Each of the conveyors A and B consists primarily of a conduit and a screw therein. The transfer conveyor A comprises the approximately horizontal conduit 16 and the screw 17, and the elevating conveyor B comprises the upstanding conduit 18 and the screw 19. Any suitable means may be employed for driving the screw 17 from its rearward end and for driving the screw 19 from its lower end. The drive for the screw 19 may include the worm 20 meshing with the worm wheel 21 keyed to the round shaft 22. A square end 23 of the shaft 22 extends into a square recess 24 in the hub of the screw 19 for driving the screw from its lower end. The pin 25 passing through the square shaft 23 and the hub of the screw holds the screw against any tendency to raise out of engagement with the square end of the shaft. Directly below the square recess 24 the hub of the screw is enlarged and is counterbored at 26 to seat upon and loosely receive the dust guard 27 of the sealing ring 28. The ring 28 may be pressed into or otherwise tightly secured in the bottom wall 30 to prevent fuel or dust from entering the gear housing 31. Motion imparted to the worm 20 from a prime mover (not shown) will be transmitted through the worm wheel 21 and the shaft 22 for rotating the screw 19 in the conduit 18.

Heretofore, in stokers of the character described it has been necessary to remove bodily the entire elevating conveyor B from the locomotive to make repairs to or to remove or replace the elevating screw. This costly practise is obviated by this invention as will presently appear.

It will be observed that the conveyors A and B are separated and offset at their adjacent ends beneath the cab deck 15. The transfer conveyor is positioned approximately horizontal, whereas the elevating conveyor is disposed more nearly vertical than horizontal, and is inclined toward the backhead 11. The angle of inclination is such that the extended axis of the screw 19 intersects the backhead 11 and the locomotive frame 10a. There is not sufficient space between the ends of the elevator conduit 18 and the backhead 11 and the frame 10a to remove the screw 19 endwise from the conduit while in place on the locomotive. The important feature, therefore, in the structure of this invention is the construction of the elevator conduit 18 permitting the screw 19 to be removed or replaced through the cab 14.

The elevator conduit 18 comprises the tubular, or, as shown, cylindrical casing portion 40 above the cab deck 15 and the hopper portion 41 beneath said deck. These portions meet in the plane of the under side of the deck 15 and the hopper portion 41 opens upwardly at one side of the casing portion 40 between the lower edge 42 and the vertical walls 43, 44 and 45. The wall 43 forms the rear wall of the hopper portion and the walls 44 and 45 form its side walls. At the junction of the casing and hopper portions, the side walls 44, 45 spread outwardly from the arcuate front wall 46 of the hopper portion to form the hopper 47 of greater width than the diameter of the screws 17 and 19. The radius of the round portion of the front wall 46 is the same as the radius of the cylindrical casing portion and is swung from a common axis, the axis of the screw 19. It will be seen from Figs. 2 and 5 that the lower corners 48 of the casing portion flare outwardly to the plane of the side walls 44, 45 directly thereunder.

The casing portion 40 is divided lengthwise and is formed with the upper or outer half or shell 50 detachable from the lower or inner half or shell 51. The casing portion 40 as a whole could be made separable from the hopper portion 41 but it is preferred to form the inner shell 51 integral with the hopper portion. At its lower end the outer shell 50 seats on the walls 44, 45 and is separable therefrom. Cap screws 52 extending through the lugs 53 of the outer shell 50 into the bosses 54 on the inner shell 51 detachably secure the outer shell of the casing portion in operative position. A flat cover 55 in the horizontal plane of the deck 15 is hinged at 56 to the lower end of the outer shell 50 and rests upon the upper edges of the hopper walls 43, 44 and 45. When the cover 55 is raised about the hinge 56 there is an opening in the deck 15 through which fuel can be delivered manually into the hopper 47. Fuel conveyed by the transfer conveyor A is delivered into the hopper 47 through the opening 57 in the rear wall 43. Any suitable universal connection 58 may be employed between the conduit 16 and the hopper portion 41. Because of the hinge connection 56 the flat cover 55 is removable with the outer shell 50.

Means are provided for rigidly securing the elevator conduit 18 to the backhead 11. For this purpose a bracket 60 bolted to the lower end of the backhead receives the foot member 61 integral with the hopper portion 41. The foot member is bolted to the bracket which forms the main support for the conduit 18. Additional securing means is provided, however, at the upper end of the conduit. There the flanges 62 integral with the inner shell 51 overlap the backhead 11. Studs 63 engage the flanges 62 and the backhead to firmly secure the upper end of the inner shell 51 to the firebox.

The inner shell 51 opens upwardly and forwardly into the firing opening 12 and the outer shell 50 curves forwardly and laterally at its upper end to the line of separation between the two forming a hood for the casing portion 40 above the screw 19. Any conventional form of firedoor 65 may be placed above the inner shell 51 to close the upper portion of the firing opening 18.

With the outer shell 50 and the flat cover 55 removed, the conduit 18 is open from the rear wall 43 of the hopper portion 41 to the upper end of the inner shell 51 of the casing portion 40. This opening permits the screw 19 to be taken out of the conduit by removing the pin 25, raising the screw out of engagement with the square end 23 of the shaft 22 and lifting the screw into the cab 14. A still larger opening for removing the screw is provided by opening the firedoor. With the firedoor in open position and the shell 50 and cover 55 removed, there is an opening for removing the screw 19 extending from the wall 43 of the hopper portion 41 to the upper marginal edge of the firing opening 12.

Thus, the screw 19 may be removed for repairs or replacement without dismantling the entire elevator conveyor B from the locomotive. Repairs and replacements can be made quickly with a minimum of time and labor. The construction of the conduit 18 has the additional advantage of permitting foreign material to be readily observed and quickly removed. Any construction in the elevating conveyor caused by foreign material can be located by removing the outer shell 50, which, in effect, constitutes a detachable cover on the casing portion of the elevator conduit.

I claim:

1. In a locomotive, in combination, a firebox having a backhead with a firing opening therein, a cab, a deck for said cab and a stoker elevating conveyor extending from beneath said deck forwardly and upwardly to the firing opening, the angle of inclination of said conveyor with respect to the backhead being such that the extended axis of the conveyor intersects the plane of the backhead, said conveyor comprising a conduit and a screw rotatable therein, said conduit including a casing shell portion and a hopper portion rigidly secured to said backhead and arranged with the casing shell portion above said deck and the hopper portion beneath said deck, said hopper and casing shell portions being approximately U-shaped in cross section, the free edges of said U-shaped portions defining a continuous opening providing access to the interior of said conduit from said cab, the lower portion of said screw being within said hopper portion and the upper portion of said screw being in said casing shell portion, and a detachable cover on said hopper and casing shell portions closing the opening thereof into the cab, said last named opening upon removing said cover permitting the screw to be removed and replaced from said cab.

2. In a locomotive, in combination, a firebox having a backhead with a firing opening therein, a cab, a deck for said cab and a stoker elevating conveyor extending from beneath said deck forwardly and upwardly to the firing opening, the angle of inclination of said conveyor with respect to the backhead being such that the extended axis of the conveyor intersects the plane of the backhead, said conveyor comprising a conduit and a screw rotatable therein, said conduit including a casing shell portion and a hopper portion rigidly secured to said backhead and arranged with the casing shell portion above said deck and the hopper portion beneath said deck, said hopper and casing shell portions being approximately U-shaped in cross section, the free edges of said U-shaped portions defining a continuous opening providing access to the interior of said conduit from said cab, the lower portion of said screw being within said hopper portion and the upper portion of said screw being in said casing shell portion, and a detachable cover on said hopper and casing shell portions closing the opening thereof into the cab, said last named opening upon removing said cover permitting the screw to be removed and replaced from said cab, said cover consisting of a flat section in the plane of said deck over said hopper portion of the conduit and a section forming with said casing shell portion a tubular housing for that portion of the screw above said deck.

3. In a locomotive, in combination, a firebox having a backhead with a firing opening therein, a cab, a deck for said cab and a stoker elevating conveyor extending from beneath said deck forwardly and upwardly to the firing opening, the angle of inclination of said conveyor with respect to the backhead being such that the extended axis of the conveyor intersects the backhead, said conveyor comprising a conduit and a screw rotatable therein, said conduit including a casing shell portion and a hopper portion rigidly secured to said backhead and arranged with the casing shell portion above said deck and the hopper portion beneath said deck, said hopper and casing shell portions being approximately U-shaped in cross section and opening into said cab, the lower portion of said screw being within said hopper portion and the upper portion of said screw being in said casing shell portion, and a detachable cover on said hopper and casing shell portions closing the opening thereof into the cab, said last named opening upon removing said cover permitting the screw to be removed and replaced from said cab, said cover consisting of a flat section in the plane of said deck over said hopper portion of the conduit and a section forming with said casing shell portion a tubular housing for that portion of the screw above said deck, one of said sections being hinged to the other.

4. In a locomotive, in combination, a firebox having a backhead with a firing opening therein, a cab, a deck for said cab, a stoker conduit extending from beneath said deck forwardly and upwardly toward the firing opening, the angle of inclination of said conduit with respect to the backhead being such that the extended axis thereof intersects the plane of said backhead, said conduit including a tubular casing extending upwardly from the plane of said deck and a hopper-like member communicating with said tubular casing and extending rearwardly therefrom beneath the plane of said deck, said rearwardly extending portion opening upwardly through said deck into said cab, said tubular casing being split lengthwise, the rearward portion of said split tubular casing being removable to form an opening continuous with the opening in said hopper-like member providing access to the interior of said stoker conduit from said cab, and a detachable cover for said hopper-like member forming with said removable cover a closure for said continuous opening.

E. ARCHER TURNER.